United States Patent
Jia et al.

(10) Patent No.: US 11,854,162 B2
(45) Date of Patent: Dec. 26, 2023

(54) MICROSCOPY WITH NEAR-IDEAL SCMOS CAMERA

(71) Applicants: Georgia Tech Research Corporation, Atlanta, GA (US); Shu Jia, Atlanta, GA (US); Biagio Mandracchia, Atlanta, GA (US)

(72) Inventors: Shu Jia, Johns Creek, GA (US); Biagio Mandracchia, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 350 days.

(21) Appl. No.: 17/429,189

(22) PCT Filed: Feb. 18, 2020

(86) PCT No.: PCT/US2020/018571
§ 371 (c)(1),
(2) Date: Aug. 6, 2021

(87) PCT Pub. No.: WO2020/172123
PCT Pub. Date: Aug. 27, 2020

(65) Prior Publication Data
US 2022/0198611 A1 Jun. 23, 2022

Related U.S. Application Data

(60) Provisional application No. 62/807,016, filed on Feb. 18, 2019.

(51) Int. Cl.
*G06T 5/00* (2006.01)
*G06T 5/20* (2006.01)
(Continued)

(52) U.S. Cl.
CPC .............. *G06T 5/002* (2013.01); *G06T 5/20* (2013.01); *H04N 1/00132* (2013.01);
(Continued)

(58) Field of Classification Search
CPC . G06T 5/002; G06T 5/20; G06T 2207/10056; G06T 2207/10064;
(Continued)

(56) References Cited

U.S. PATENT DOCUMENTS

| 5,965,871 A * | 10/1999 | Zhou | H04N 25/616 |
| | | | 348/E3.021 |
| 2005/0231615 A1* | 10/2005 | Kitani | H04N 25/677 |
| | | | 348/241 |

(Continued)

*Primary Examiner* — Tom Y Lu
(74) *Attorney, Agent, or Firm* — Bryan W. Bockhop; Bockhop Intellectual Property Law, LLC

(57) ABSTRACT

In a method of filtering an image from data received from a CMOS camera, image data is loaded by a computational device from the camera. Camera parameters corresponding to the CMOS camera are loaded. Fixed pattern noise associated with the camera is removed based on the camera parameters. A readout noise estimation based on characteristics of the camera and filtering estimated readout noise from the image data is generated. Sparse filtering: selecting sub-frames within the image that have similar features; applying a three-dimensional transform on the sub-frames transforming the sub-frame data into a non-two-dimensional domain and generating a first transformed data set; filtering noise data from the first transformed data set to generate a first thresholded image data set; and applying a reverse three-dimensional transform on the first thresholded image data set so as to generate an image.

19 Claims, 3 Drawing Sheets

(51) Int. Cl.
 *H04N 1/00* (2006.01)
 *H04N 23/80* (2023.01)
 *H04N 25/671* (2023.01)

(52) U.S. Cl.
 CPC ........... *H04N 23/80* (2023.01); *H04N 25/671* (2023.01); *G06T 2207/10056* (2013.01); *G06T 2207/10064* (2013.01); *G06T 2207/30024* (2013.01)

(58) Field of Classification Search
 CPC ............ G06T 2207/30024; G06T 5/10; H04N 1/00132; H04N 23/80; H04N 25/671; H04N 25/67; G02B 21/16; G02B 21/365
 See application file for complete search history.

(56) References Cited

U.S. PATENT DOCUMENTS

| | | | |
|---|---|---|---|
| 2008/0031537 A1 | 2/2008 | Gutkowicz-Krusin et al. | |
| 2009/0324117 A1* | 12/2009 | Demandolx | G06T 5/10 |
| | | | 382/254 |
| 2013/0093909 A1* | 4/2013 | Uchida | H04N 25/63 |
| | | | 348/221.1 |
| 2014/0015921 A1 | 1/2014 | Foi et al. | |

\* cited by examiner

MICROSCOPY WITH NEAR-IDEAL SCMOS CAMERA

CROSS-REFERENCE TO RELATED APPLICATION(S)

This application claims the benefit of U.S. Provisional Patent Application Ser. No. 62/807,016, filed Feb. 18, 2019, the entirety of which is hereby incorporated herein by reference.

BACKGROUND OF THE INVENTION

1. Field of the Invention

The present invention relates to scientific complementary metal-oxide-semiconductor (sCMOS) cameras and, more specifically, to a system for filtering images taken by an sCMOS camera.

2. Description of the Related Art

The accurate acquisition of diverse anatomical and dynamic traits within a cell that span spatiotemporal scales provides insights into the fundamentals of living organisms. In this context, sCMOS cameras have rapidly been gaining popularity in optical microscopy for their higher frame rates, wider field-of-view, and lower electrical noise, compared to charge-coupled devices (CCD) or electron-multiplying CCDs (EM-CCD) cameras.

Physically, both CCD and CMOS cameras accumulate a signal charge in each pixel proportional to the local illumination intensity. When the exposure is complete, a CCD camera transfers each pixel's charge budget sequentially to a common output structure. This structure converts the charge to a voltage and sends it off-chip, so that most functions take place in the camera's printed circuit board. Instead, in a CMOS imager, the charge-voltage conversion takes place in each pixel and most functions are integrated on the chip. Such difference in the readout technique has several implications in the capabilities and limitations of these two sensor architectures.

Newer sCMOS cameras approach the imaging performance of a true low-light detector, with a low readout noise (1-2e) at extremely rapid readout rate (up to 560 MHz). However, the readout technique remains unchanged, and thereby individual pixels are still characterized by different offsets, variances and gains, so that they appear to flicker even when there are no expected incident photons. The extra noise source, combined with other major sources such as readout and photon shot noise, reduces the image quality and impairs fast and quantitative imaging using sCMOS cameras.

Various attempts have been made to minimize the influence of the noise sources correlated to acquisition devices, especially in low-light conditions. However, the classic assumptions of white noise become invalid at low-photon counts for CMOS and sCMOS sensors. To fully address the CMOS-related noise, different methods have been implemented to estimate the detector's response using either a camera calibration prior to acquisition or the statistical analysis of the processed data. However, these methods do not effectively remove the camera noise in many practical cases, either because of a tradeoff between noise correction and detail preservation or the lack of a precise knowledge concerning the imaging system or the noise statistics.

Therefore, there is a need for a system that effectively minimizes noise in images from sCMOS cameras.

SUMMARY OF THE INVENTION

The disadvantages of the prior art are overcome by the present invention which, in one aspect, is a method of filtering an image from data received from a CMOS camera in data communication with a computational device, in which image data corresponding to an initial image is loaded by the computational device from the CMOS camera. The initial image is of a known type in a two-dimensional domain. Camera parameters corresponding to the CMOS camera are loaded by the computational device. Fixed pattern noise associated with the CMOS camera is removed from the image data based on the camera parameters. A readout noise estimation based on characteristics of the CMOS camera and filtering estimated readout noise from the image data is generated. Sparse filtering on the image data is performed using steps including: selecting at least a first plurality of sub-frames within the initial image that have similar features; applying a three-dimensional transform on sub-frame data corresponding to the first plurality of sub-frames so as to transform the sub-frame data into a non-two-dimensional domain, thereby generating a first transformed data set; filtering noise data from the first transformed data set using predetermined thresholds so as to generate a first thresholded image data set; and applying a reverse three-dimensional transform on the first thresholded image data set so as to generate a thresholded image.

In another aspect, the invention is a method of filtering an image from data received from a scientific CMOS camera, in which image data corresponding to an initial image is loaded from the scientific CMOS camera, wherein the initial image is of a known type in a two-dimensional domain. Camera parameters corresponding to the scientific CMOS camera are loaded. Fixed pattern noise associated with the scientific CMOS camera is removed from the image data based on the camera parameters. A readout noise estimation based on characteristics of the scientific CMOS camera is generated. Estimated readout noise is filtered from the image data by performing steps including: calculating an optical transfer function corresponding to the scientific CMOS camera; generating a high-pass filter based on the optical transfer function; and filtering the image data with the high-pass filter. Sparse filtering is performed on the image data by performing steps including: selecting at least a first plurality of sub-frames within the initial image that have similar features; applying a three-dimensional transform on sub-frame data corresponding to the first plurality of sub-frames so as transform the sub-frame data into a non-two-dimensional domain, thereby generating a first transformed data set; filtering noise data from the first transformed data set using predetermined thresholds so as to generate a first thresholded image data set; and applying a reverse three-dimensional transform on the first thresholded image data set so as to generate a thresholded image; selecting at least a second plurality of sub-frames within the thresholded image that have similar features; applying the three-dimensional transform on sub-frame data corresponding to the second plurality of sub-frames so as transform the sub-frame data into the non-two-dimensional domain, thereby generating a second transformed image data set; applying Wiener filtering to the second transformed image data set so as to generate Wiener filtered data; and applying the reverse three-dimensional transform on the Wiener filtered data so to generate a Wiener filtered image.

In yet another aspect, the invention is a CMOS camera that includes a CMOS video sensor and a processor that is receptive to image data from the CMOS video sensor. The processor programmed to execute a plurality of instructions, including: loading image data corresponding to an initial image from the CMOS camera, wherein the initial image is of a known type in a two-dimensional domain; loading camera parameters corresponding to the CMOS camera; removing fixed pattern noise associated with the CMOS camera from the image data based on the camera parameters; generating a readout noise estimation based on characteristics of the CMOS camera and filtering estimated readout noise from the image data; and performing sparse filtering on the image data by performing steps including: selecting at least a first plurality of sub-frames within the initial image that have similar features; applying a three-dimensional transform on sub-frame data corresponding to the first plurality of sub-frames so as transform the sub-frame data into a non-two-dimensional domain, thereby generating a first transformed data set; filtering noise data from the first transformed data set using predetermined thresholds so as to generate a first thresholded image data set; and applying a reverse three-dimensional transform on the first thresholded image data set so as to generate a thresholded image.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
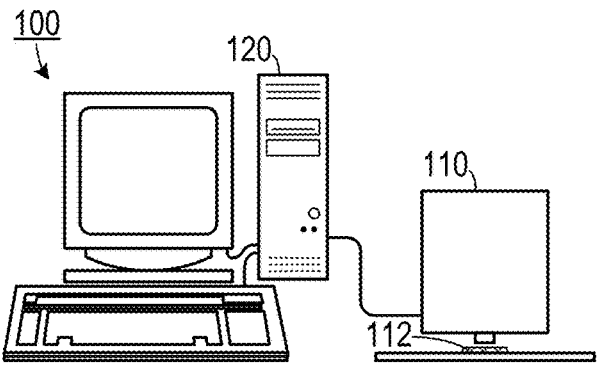
FIG. 1 is a schematic diagram of one embodiment of an sCMOS camera apparatus.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one representative embodiment of a CMOS camera system 100 includes a CMOS video sensor 110 (such as a scientific CMOS camera) and a processor 120 that is receptive to image data from the CMOS video sensor 110. The CMOS video sensor 110 can be of the type that is used to photographs images for scientific purposes. In one example it can be used in photographing microscopic samples 112 such as fluorescent biological and crystallographic images. In another example, it can be used to photograph astronomical images.

Figure 2:
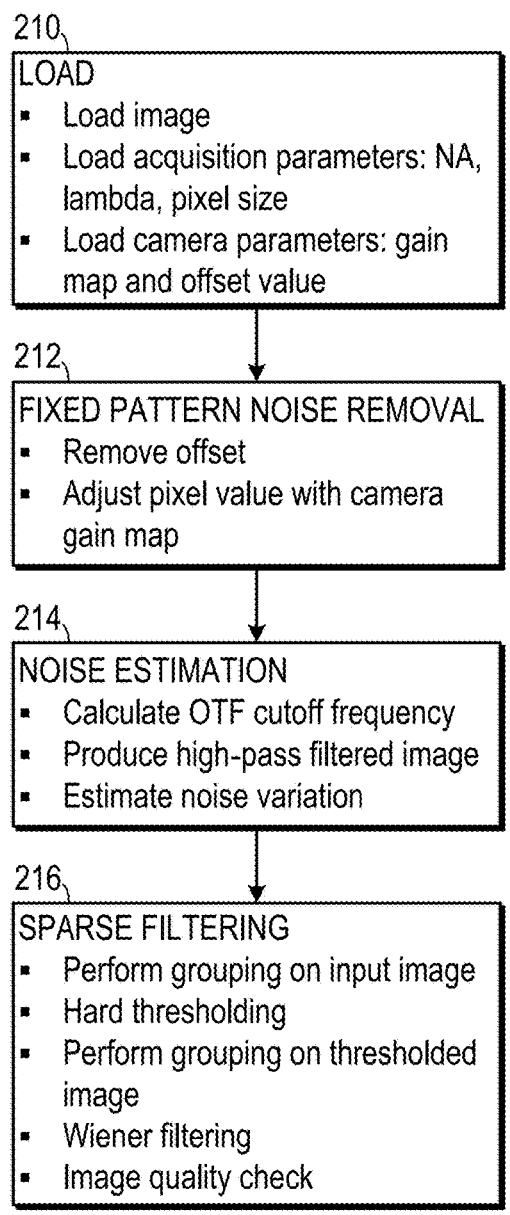
FIG. 2 is a flowchart showing one representative method of removing noise from an sCMOS camera-generated image.

As shown in FIG. 2, the processor is programmed to execute a plurality of instructions, including: loading image data 210 corresponding to an initial image from the CMOS camera, wherein the initial image is of a known type in a two-dimensional domain. Camera parameters corresponding to the CMOS camera are also loaded. Acquisition parameters are also loaded into the processor. Fixed pattern noise is removed 212 from the initial image. Fixed pattern noise can be removed by adjusting pixel values based on a gain map corresponding to the CMOS camera.

Noise is estimated 214 and a high pass filter is applied to the image. Then sparse filtering is applied to the image 216 by grouping the image, applying hard thresholding to produce a thresholded image. The thresholded image is grouped and Wiener filtering is applied to the groups so as to generate a filtered image. The filtering parameters may be calculated after photographing an initial test image, stored by the processor and then applied to subsequently-photographed images.

Figure 3:
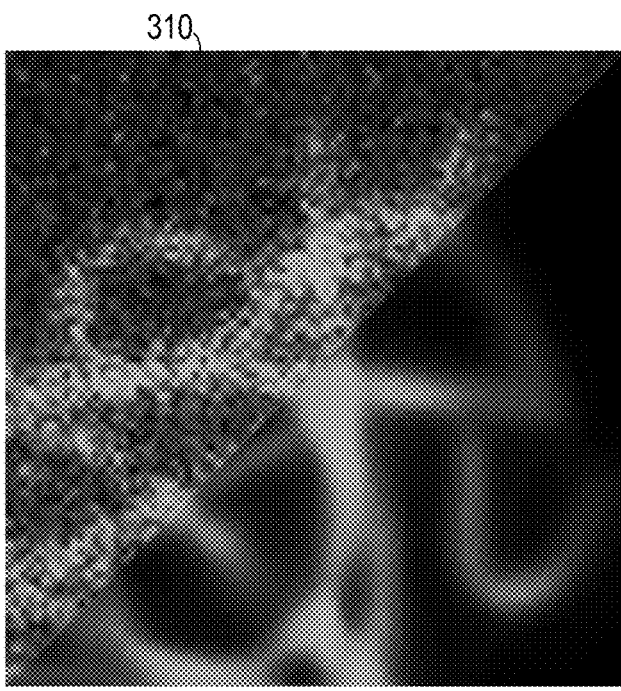
FIG. 3 is a split photograph showing part of a sCMOS image without noise removed and part of the sCMOS image from which noise has been removed.

As shown in FIG. 3, a raw image 310 of a fluorescent biological structure includes a considerable amount of noise. However, filtering of the type described below results in a relatively noise-free image 320.

Figure 4A:
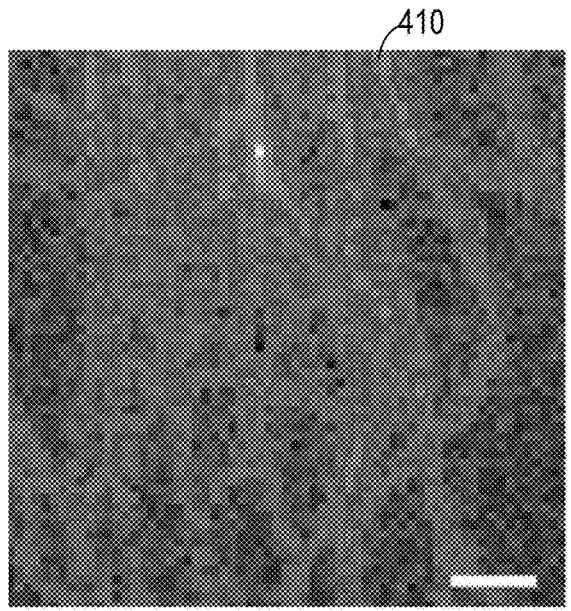
FIGS. 4A-4D are a series of images showing biological sample image filtering employing one embodiment of the invention.
Figure 4B:
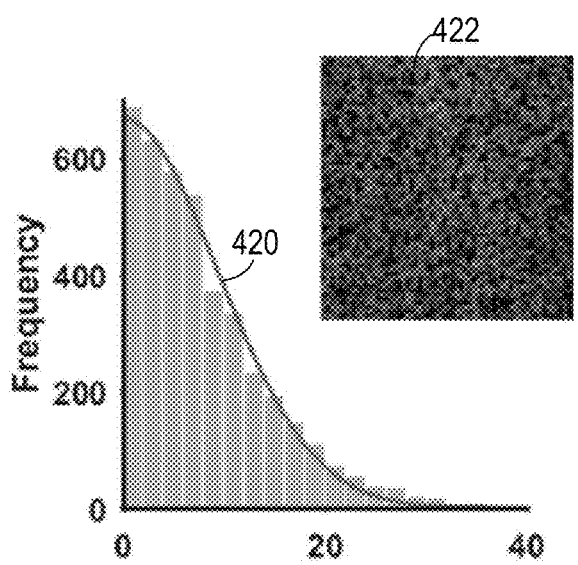
Figure 4C:
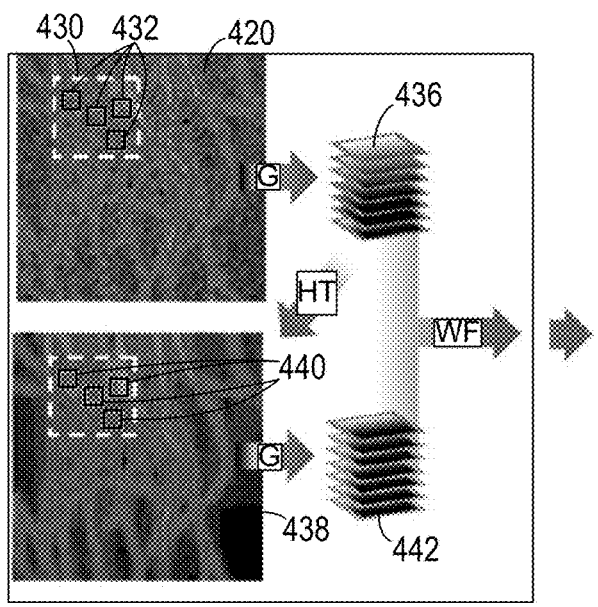
Figure 4D:
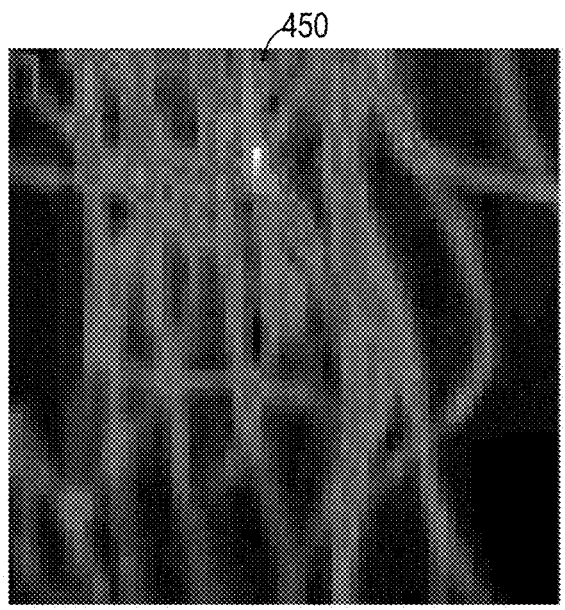

In operation, the noisy input image 410 is rescaled using offset and gain pixel maps that are associated with the camera, as shown in FIG. 4A. As shown in FIG. 4B, the variation of the noise in the input image is estimated by the intensity distribution 420 of the pixel values in a high-pass filtered image 422. This image is generated setting the threshold of the filter at the optical transfer function (OTF) boundary. In this way, the entire signal is filtered out of the image. The estimated noise variation is used as a parameter for sparse denoising. As shown in FIG. 4C, the input image is scanned in steps of three pixels and at each step a reference patch is chosen and the software selects up to eight similar sub-frame patches 432 (only four of which are show in FIG. 4C for the sake of simplicity) within a certain neighborhood 430. All these patches 432 (sub-frames) are then grouped (G) in 3D stacks 436. Each stack is filtered using a 3D hard thresholding (HT) transform and aggregated to generate an intermediate thresholded image 438. Sub-frame patches 440 are again selected based on self-similarity and grouped (G) to obtain new 3D stacks 442. Finally, Wiener filtering (WF) is applied to both sets of stacks to generate the final Wiener-filtered image 450.

In cases where several images are taken over time of the same sample, a third plurality of sub-frame patches can be selected based on similar features. A three-dimensional transform is applied to the sub-frame data corresponding to the third plurality of sub-frames so as transform the sub-frame data into a non-two-dimensional domain, thereby generating a third transformed data set. Noise data is filtered from the third transformed data set using predetermined thresholds so as to generate a third thresholded image data set. A reverse three-dimensional transform is applied to the third thresholded image data set so to generate a third thresholded image.

Noise in a camera image is the aggregate spatial and temporal variations in the measured signal, assuming constant, uniform illumination. The total effective noise per pixel is the quadrature sum of different noise components. The most relevant ones are:

- Dark Shot Noise (DS). Dark current is a current that flows even when no photons are incident on the camera. It is a thermal phenomenon resulting from electrons spontaneously generated within the silicon chip (valence electrons are thermally excited into the conduction band). The number of dark electrons collected during the exposure is the dark shot noise, which does not depend on the signal level.
- Photon Shot Noise (PS). This is the statistical noise associated with the arrival of photons at the pixel. Since photon measurement obeys Poisson statistics, the photon shot noise is given by the standard deviation of Poisson distribution, σp, which is equal to the square root of the signal.
- Readout Noise (R). This is the noise generated in producing the electronic signal, which results from the sensor design but also by the design of the camera electronics. CMOS sensors are silicon-based integrated circuits formed by a dense matrix of photo-diodes that convert photons into electronic charge. This charge, generated by the interaction between photons and silicon atoms, is stored in a potential well. CMOS pixels perform charge-to-voltage conversion at each location using an extra circuitry that increases readout noise and generates extra fixed pattern noise sources compared to CCDs.
- Fixed-pattern Noise. Given a uniform light source, different CMOS pixels will generate a different number of photoelectrons from the same number of impinging photons. This difference in pixel response is referred as photo-response non-uniformity or fixed-pattern noise, and is caused by variations in pixel geometry, substrate material and micro-lenses. This is even more relevant in sCMOS sensors, where the increased signal capacity and much lower readout noise comes at the expenses of the fixed pattern noise due to pixel gain fluctuations.

The effect of fixed-pattern noise depends on the electronics of the camera, is proportional to the illumination level, and can be modeled by a multiplicative component, γ, and a bias, β.

Ideal camera. We consider an ideal camera as a device that achieves the maximum pixel sensitivity. This means that every photon is converted to a photoelectron, i.e. the quantum efficiency (QE) is 100%, every pixel voltage is digitized identically, i.e. γ=1 and β=R=0, and there is no dark current, i.e. $D_S=0$.

The relation between the sensitivity and the quality of an image is given by the signal to noise ratio (SNR) as a function of the input photon number (S). The formula to calculate the SNR for a single pixel at various light intensities is:

$$SNR = \frac{QE \cdot (\gamma \cdot S + \beta)}{\sqrt{QE \cdot (\gamma \cdot S + \beta + b) + (R)^2}}$$

where b is the signal background.

In case of a perfect detector with an ideal signal, i.e. no background, this equation becomes:

$$SNR = \sqrt{S} = \sigma_P,$$

As mentioned above, $P_S = \sigma_P$, which reminds us that even with an ideal camera, the signal is still affected by photon shot noise, which is intrinsic of photon statistics. However, even if noise cannot be completely eliminated from the measuring process, effort must be placed in order to minimize the noise sources of the devices.

Here we present a software for the Automatic Correction of sCMOS-related Noise (ACsN) that combines camera calibration, noise estimation and sparse filtering in order to correct the most relevant noise sources generated by a sCMOS camera.

A pseudo-code of the algorithm that is employed by the processor is presented below. The algorithm uses the known parameters of the experimental setup to correct pixel-dependent signal fluctuation and to produce a precise estimation of the readout noise. Then, sparse filtering is used to remove the predicted noise through the enhancement of the self-similarity of the sample.

| Pseudo-Code Table: |
| --- |
| LOAD |
|     Load image |
|     Load acquisition parameters: NA, lambda, pixel size |
|     Load camera parameters: gain map and offset value |
| FIXED PATTERN NOISE REMOVAL |
|     Remove offset |
|     Adjust pixel value with camera gain map |
| NOISE ESTIMATION |
|     Calculate OTF cutoff frequency |
|     Produce high-pass filtered image |
|     Estimate noise variation |
| SPARSE FILTERING |
|     Perform grouping on input image |
|     Hard thresholding |
|     Perform grouping on thresholded image |
|     Wiener filtering |
|     Image quality check |
|         3D Grouping and Video Processing |

This results in a quantitative image restoration that permits to retrieve from noisy data the same information that would be otherwise obtained with a higher-intensity, slower imaging.

Canceling fixed-pattern noise sources: The number of photons $S_p(\tau)$ impinging the photo-diode p during a certain exposure time τ follows a Poisson distribution. If we suppose that an electron is generated for each absorbed photon, the number of electrons generated on the potential well is also Poisson distributed. In the ideal case, the voltage measured at the sensor output should be proportional to the collected charge: $V = Cq = C \cdot S_p(\tau)$, where C is the equivalent capacitance of the photo-diode and q the electric charge. However, the presence of fixed-pattern noise in sCMOS cameras generates in different pixels a different number of photoelectrons from the same number of impinging photons. This effect is proportional to the illumination level and reflects the probability that a photon can be absorbed by the photo-diode. It is modeled as a multiplicative factor $\gamma_p$ applied to the parameter of the Poisson distributed variable $S_p(\tau)$.

During the AD conversion, the voltage produced by each pixel is read as a difference from a reference level, which represents the absence of light. In practice, this reference voltage is assigned a positive value large enough that voltages below the reference will still correspond to positive values. This is responsible for a bias ($\beta_p$) in the measured intensity values, especially relevant at low light levels.

Finally, another kind of fixed-pattern noise is related to the fact that the readout for CMOS sensors is performed line by line. At a given time, all columns of one line are readout through the output column amplifiers. Differences from one column amplifier to another introduce a column fixed pattern, which is also proportional to the signal intensity and its contribution can be included in $\gamma_p$ and $\beta_p$.

The acquisition of a sCMOS camera can be modeled, then, by the equation:

$$Z_p = \gamma_p \text{Pois}\{S_p(\tau)\} + N(0,\sigma_R) + \beta_p$$

where Zp is the value of the pixel p and $N(\mu_R, \sigma_R)$ the Gaussian distributed readout noise of mean $\mu_R=0$ and standard deviation $\sigma_R$. In this simplified model we have omitted the contribution of dark current, which can be neglected for exposure times below 1 second, and the quantization noise due to the analog to digital conversion, which is negligible compared to readout noise.

Since fixed-pattern noise depends only on the camera circuitry, $\beta_p$ and $\gamma_p$ can be estimated through a one-time calibration. We have mapped the pixel-dependent offset βp by averaging a series of dark frames while the gain $\gamma_p$ was estimated from multiple sets recorded at different illumination intensities.

Once both βp and $\gamma_p$ are available, the acquired image can be rescaled to remove the fixed pattern noise component from the measurement:

$$M_p = \frac{Z_p - \beta_p}{\gamma_p}.$$

Clearly, $M_P$ represents a mixture of the incoming photons from the sample and the randomly generated readout noise from the AD conversion. Thus, in order to obtain $S_p$, a careful estimation of both the readout noise $(0, \sigma_R)$ and the fluctuation due to photon shot noise $\text{Pois}\{S_p(\tau)\}$ is necessary in order to remove the noise efficiently while preserving the underlying signal.

Noise estimation: Camera-related noise has been modeled as the contribution of both readout noise and photon shot noise. It is important to notice that these two contributions have different statistics. In fact, the former is a Gaussian white noise, while the latter follows a Poisson distribution. However, the Poisson distribution becomes a good approximation of the Gaussian distribution when the photon flux $(\Delta_p)$ is greater than 3 photons/pixel and the error committed by approximating $\sigma_p$ with a Gaussian standard deviation $\sigma_p$ is less than 1% when the photon flux is more than 5 photons/pixel.

Notably, the abovementioned conditions on the photon flux are usually satisfied for many applications in fluorescence microscopy. Therefore, we consider the camera-related noise as the result of the sum of two independent Gaussian-distributed random variables, which, by theory, is still a Gaussian-distributed random variable:

$$N(\mu_N,\sigma_N) = N(0,\sigma_R) + N(\mu_P,\sigma_G) = N(\mu_P,\sqrt{\sigma_R^2+\sigma_G^2}).$$

Thus, we model the camera noise as a white Gaussian noise, which means that it generates a pattern of Gaussian distributed intensities in each frame and has a constant power spectral density (PSD). In particular, the constant PSD implies that the noise is present at every frequency and cannot be simply removed by band-pass filters in the Fourier space.

An alternative solution is to adopt patch-based denoising techniques, which rely on the self-similarity of the sample in space or time. Here, in order to untangle the contribution of the actual signal from the camera noise in $M_p$, we evaluate the self-similarity based on the sparsity in the Fourier space.

However, an accurate estimation of the noise variation, $\sigma_N$, is fundamental to retain the fidelity of the reconstruction, both in terms of quantitatively of the recovered intensity values and resolution of the image. To this end, we use a few known instrumental parameters, i.e. numerical aperture (NA), emission wavelength and pixel size, to calculate the radius of the optical transfer function (OTF) of the system. Given that most of the signal will be contained by the OTF, we use a high-pass filter to isolate the high frequencies of the image, where the noise contribution is separated by the statistics of the photoelectrons. This way, it is feasible to characterize the noise and obtain a precise estimation of $\sigma_N$.

If we call H(f) the modulation transfer function (MTF) of the system, we have that:

$$\sigma_N^2 = \int_0^\infty N_0 |H(f)|^2 df,$$

where $N_0$ is a constant value that represents the noise power per unit bandwidth.

In practice, white noise cannot be fully recorded because every camera acts as a low pass filter with cutoff frequency $\bar{f}$ and, thereby, its MTF will be:

$$H(f) = \begin{cases} 1, f \leq \bar{f} \\ 0, f > \bar{f} \end{cases}$$

and the exact variance will be:

$$\sigma_N^2 = \int_0^{\bar{f}} N_0 |H(f)|^2 df.$$

Now, if we apply a high pass filter with cutoff frequency $f_c$ equal to that of the optical system to the input noisy image, we will obtain another image with:

$$\sigma_C^2 = \int_{f_c}^{\bar{f}} N_0 |H(f)|^2 df.$$

From these equations and we can obtain:

$$\frac{\sigma_N^2}{\sigma_c^2} = \frac{\int_0^{\bar{f}} N_0 |H(f)|^2 df}{\int_{f_c}^{\bar{f}} N_0 |H(f)|^2 df}$$

Finally, through substitution and solving the integrals, we have that:

$$\sigma_N = \sqrt{\frac{\bar{f}}{(\bar{f} - f_c)}} \sigma_c.$$

Aberrations in the microscope system might alter the effective OTF radius, which makes the use of the theoretical value a conservative approach. However, this does not affect the estimation of $\sigma_N$ as long as the PSD of the noise remains constant with the frequency, as mentioned earlier.

Sparse filtering: Once the standard deviation of the noise is known, we proceed to filter it out. To do so, we use sparse filtering to take advantage of the self-similarity of the sample. The process can be divided into three main parts: grouping, collaborative filtering and aggregation.

The grouping uses the block-matching concept to find similar patches for each reference patch. It groups a reference patch with the similar patches into a 3D array. Specifically, the algorithm chooses a k×k patch (P) in the noisy image and searches an m×m area for other similar patches (Q). Such similarity is assessed by the normalized square distance in $L_2$:

$$\mathcal{P}^h(P) = \tau_{3D}^{h^{-1}}(\gamma(\tau_{3D}^h(\mathcal{P}[P]))),$$

Then, the similar patches are stacked in a 3D group, [P], up to a maximum of 8. This is repeated with different reference patches until all the noisy images are stacked in 3D groups.

At this point, collaborative filtering employs a 3D transform $\tau_{3D}^h$, to filter the coefficients of each group all at once. Due to the similarity between the patches, the 3D transform results in even sparser representation of the original patches than the 2D transforms whereas the noise still has a constant power spectrum. Collaborative filtering can be expressed by the formula:

$$\mathcal{P}^h(P) = \tau_{3D}^{h^{-1}}(\gamma(\tau_{3D}^h(\mathcal{P}[P]))),$$

where $\gamma$ is a hard-thresholding operator with threshold $\lambda_\gamma \sigma_N$:

$$\gamma(x) = \begin{cases} 0 & |x| \leq \lambda_\gamma \sigma_N \\ x & \text{otherwise} \end{cases}$$

where $\sigma_N$ is the previously determined noise variation, and $\lambda_\gamma$ a multiplicative factor.

Once the collaborative filtering produces all the patch estimates, the aggregation procedure returns the denoised patches to their original locations. During the grouping part, one patch can be assigned to more than one group. This implies that pixels can have more than one estimation. The final estimate is computed as a weighted average of all overlapping pixels. The weights are defined so that homogeneous patches are prioritized over the patches containing edges and corners:

$$w_P = \begin{cases} (N_P)^{-1} & \text{if } N_P \geq 1 \\ 1 & \text{otherwise} \end{cases}$$

where $N_P$ is the number of non-zero coefficients in the 3D block after hard-thresholding.

Finally, the image obtained after this process is used as an intermediate denoised image for a second run of sparse filtering. This second-time process is the same as the first one with the only difference being the use of Wiener filtering on both noisy and intermediate images instead of hard-thresholding:

$$\mathcal{P}^w(P) = \tau_{3D}^{w^{-1}}(c_P \cdot \tau_{3D}^w(\mathcal{P}[P])),$$

where the Wiener coefficient is:

$$C_P = \frac{|\tau_{3D}^w(\mathcal{P}[P])|^2}{|\tau_{3D}^w(\mathcal{P}[P])|^2 + \sigma_N^2}.$$

It is important to note how both collaborative filtering steps depend on the estimation of $\sigma_N$ and how, thus, the accuracy of this estimation affects the effectiveness of the denoising process. In particular, the threshold $\lambda_\gamma \sigma_N$ is one of the most important parameter in terms of denoising performance.

Denoising of video sequences: In case of noisy video sequences, ACsN evaluates the image quality improvement and has the option to perform a further sparse filtering step, referred to as sparse video filtering. This is similar to the first sparse filtering operation with the difference being that during the grouping task the algorithm looks for similar patches also in the neighboring frames. This means that the search area for similar patches this time is not an m×m square but an m×m×t spatiotemporal volume. This way, lingering noise can be further reduced taking advantage of the sample self-similarity, not only in space, but also in time.

The spatiotemporal correction is performed first along the time direction and then across the space. The similar patches are searched in a three-dimensional sequence of blocks built following a specific trajectory, which is supposed to follow the motion in the scene. Indeed, to maximize the temporal correlation, during video filtering the search window is shifted according to a motion estimation of the reference patch in time. This is performed using a motion estimator with the sequence down-sampled by a factor of two and computing the motion trajectories using a fast diamond search. The trajectory of a block is defined by the sequence of the most similar blocks in the neighboring t frames. Note that down-sampling increases the signal-to-noise ratio, making the motion estimation less impaired by noise.

It is important to notice that the motion estimation is performed over an area of q×q pixels for each frame, where q is chosen in order to alleviate the sampling requirements in relation to the dynamics while retaining a low runtime by parallelizing the processing of each area. Nonetheless, it is also important to notice that ACsN achieves its maximum efficiency if the number of patches in each group is maximized. This implies that the optimal temporal sampling should assure the presence of a moving feature within the each area during at least 4-8 frames.

The additional denoising operation roughly doubles the processing time, so it is important that it is run only when needed. Moreover, the improvement of video filtering becomes relevant only for very noisy images. For this reason, after the first sparse filtering step is performed, the improvement is evaluated by measuring the peak signal-to-noise ratio (PSNR) of each frame. In this evaluation, the average between each frame and its five nearest neighbors is used as reference image. If the PSNR, on average, is lower than an empirical threshold, the video filtering is performed. We have found that this is most likely to happen when the value of PSNR falls below 35, which proved to be an optimal threshold in order to reach a satisfying compromise between speed and image quality.

It should be noted that video filtering involves only an extension of the search window during the grouping phase and does not involve any time averaging, so that the temporal resolution is preserved.

In one experimental embodiment, a content-adaptive algorithm for the automatic correction of sCMOS-related noise (ACsN) for fluorescence microscopy is employed. ACsN combines camera physics and layered sparse filtering to address the most relevant noise sources in a sCMOS sensor while preserving the fine details of the signal. ACsN employs on a theoretical model that performs a joint estimation of the noise variance using frequency analysis, which results in a robust and efficient performance for input sequences with low-photon budgets. Furthermore, ACsN probes the intrinsic self-similarity in space and time of fluorescent specimens, achieving quantitative image restoration with substantially enhanced accuracy and runtime. Using this method, we have demonstrated significant improvements in both fluorescence microscopy images and their downstream analysis in a wide range of imaging conditions and modalities.

ACsN combines camera calibration, noise estimation and sparse filtering to correct the most relevant noise sources generated by a sCMOS camera. ACsN first corrects the fixed-pattern noise using a map of the offset and gain of the sCMOS pixels. The presence of the fixed-pattern noise in sCMOS cameras generates in different pixels (p) a different number of photoelectrons from the same number of impinging photons (Sp). This effect is proportional to the illumination level and can be modeled as a multiplicative factor γp applied to the parameter of the Poisson-distributed variable Sp. At the same time, during the analog-to-digital (AD) conversion, the voltage produced by each pixel is read as the difference from a reference level, which represents the absence of light. In practice, this reference voltage is assigned a positive value that is responsible for a bias (βp) in the measured intensity values. Therefore, the acquisition of a sCMOS camera can be modeled by the equation:

$$Z_p = \gamma_p \text{Pois}\{S_p(\tau)\} + N(0, \sigma_R) + \beta_p$$

where Zp is the value of the pixel p, γ the exposure time, and N (0, σR) the Gaussian-distributed readout noise of mean μR=0 and standard deviation σR. Considering the practicality of fluorescence microscopy, in this model we have omitted the contribution of dark current, which can be disregarded for exposure times below 1 second, and the quantization noise due to the AD conversion, which is negligible compared to the readout noise.

Since the fixed-pattern noise depends only on the camera circuitry, βp and γp can be estimated through a one-time calibration. However, a careful assessment of both the Gaussian-distributed readout noise, N(0, σR), and the fluctuation due to the Poisson-distributed photon shot noise, Pois{Sp(τ)}, is necessary to obtain an accurate estimate of the underlying signal Sp. To perform this assessment, we devised a noise model that allows for a joint estimation of the noise variance by analyzing the frequency response of the microscopy system. This is based on the fact that the Poisson distribution of the photon shot noise can be feasibly approximated by a Gaussian distribution when the photon flux is >3 photons per pixel. In particular, the error introduced by approximating the Poisson variance, $\sigma^2_P$, with a Gaussian variance, $\sigma^2_G$, becomes <1% when the photon flux is more than 5 photons per pixel. Notably, the abovementioned conditions on the photon flux are usually satisfied for many applications in fluorescence microscopy. Therefore, we consider the camera-related noise as the result of the sum of two independent Gaussian-distributed random variables, whose variance is $\sigma^2_N \frac{1}{4}\sigma^2_R \flat \sigma_G^2$. Such a distribution consists of a constant power spectral density, while the signals coming from the sample are contained within the optical transfer function (OTF). Therefore, we take advantage of the knowledge of the optical system to evaluate the pixel fluctuation outside the OTF, which is due to noise only, and then we use the value obtained to derive σN in the original image.

Next, the algorithm uses these noise statistics for a non-local assessment of the self-similarity of the sample and to perform collaborative sparse filtering on the input sequence. We adopted a layered approach that sequentially probes the image self-similarity in space and time in order to enhance noise correction without sacrificing accuracy and runtime. In brief, the filter decomposes the image in patches and sorts them into three-dimensional (3D) groups according to their similarity. Then, it employs a 3D transform to process each group all at once. The denoising is performed by hard-thresholding and enhanced by the fact that, due to the similarity between the patches, the 3D transform results in an even sparser representation of the original patches, whereas the noise power spectrum remains constant. Afterwards, the denoised patches are returned to their original locations to form an intermediate image. At this point, the collaborative filter is run a second time but replacing the hard thresholding with a Wiener filter. The filter is performed using both the noisy and intermediate images and generates the final denoised image. It should be noted that the spatial variation of the noise across the image may affect the performance of the Wiener filter. However, this is considerably mitigated by the use of patch-based processing, which, compared to the whole image, enhances the intensity uniformity within individual patch groups, exhibiting a great stability against spatially variant noise.

Finally, another collaborative filter is performed looking for similar patches also in the neighboring frames. This way, lingering noise can be further reduced taking advantage of the sample self-similarity in time while preserving the temporal resolution.

Characterization of ACsN. Next, we characterized the performance of ACsN using both numerical and experimental data. Notably, ACsN collaborative filtering depends on the estimation of σN, as well as on the choice of the parameters in the algorithm, which were chosen in order to optimize both the noise correction and runtime. We observed that our strategy can significantly attenuate the detrimental effect of camera noise, avoiding loss of image resolution, especially in presence of highly spatially variant noise. Moreover, the camera noise can induce temporal fluctuations of the pixel values that are not related to the sample, thus affecting the quantitative analysis of time-lapse data. ACsN denoising reduces this effect by approximately one order of magnitude, with residual fluctuations comparable to that of an ideal camera. It should be noted that at low-photon counts, the sample's details start to be comparable with the noise fluctuations and become harder to retrieve. Thus, the performance of image restoration is intrinsically related to the photon flux of the input image. Nonetheless, using both simulations and experimental data, we verified a robust ACsN noise correction at low-light levels down to 5-10 photons per pixel.

We validated the performance of ACsN under various sampling rates normally adopted for fluorescence microscopy. In practice, a sampling rate close to the Nyquist criterion represents a good tradeoff between signal to noise ratio (SNR) and detail preservation. Here, examining numerically and experimentally across a wide range of sampling rates, we demonstrated the viability of ACsN for low SNR with over-sampling and no noticeable loss of signals with under-sampling.

Unlike natural images, fluorescent images of biological samples are highly specified, exhibiting precisely labeled molecular targets or structures in cells. Therefore, each fluorescent image usually features specific objects recurring across the field of view, which supplies sufficient non-local self-similarity to make the algorithm notably efficient for fluorescence microscopy. With numerical and experimental data, we characterized the dependence of the ACsN performance on the usage of self-similarity of an input image. Furthermore, we quantitatively assessed a variety of non-biological and biological samples to verify the viability of the method, spanning various dimensionality, morphology, randomness and density, such as caliber targets, fluorescent particles, single molecules, microtubules, actin filaments, mitochondria, filopodia, lamellipodia, and small animals.

Wide-field microscopy. Wide-field microscopy, especially total internal reflection fluorescence (TIRF) microscopy, is one of the most widely used techniques in cell imaging. TIRF uses the phenomenon of total internal reflection of light at the glass/water interface in order to create an evanescent wave that propagates only for a few hundreds of nanometers across the coverslip. This allows the selective excitation of the fluorescent labels at the bottom of the sample. However, in case of weak fluorescent emitters, low-light intensity or a short exposure time, sCMOS-related noise becomes severe and deteriorates image quality. ACsN denoising can effectively reduce such contribution and recover the undistorted signals from the noise, allowing faster acquisition without compromising the underlying signal.

We demonstrated ACsN denoising of wide-field microscopy in both epi-fluorescence and TIRF configurations using various fixed, live and multi-color sub-cellular samples, including microtubules, mitochondria. The use of ACsN can maintain the same image quality with a shorter exposure time (i.e., better temporal resolution) and a lower excitation level (i.e., less photo-damage). The performance is, thus, limited primarily by the photo-physics of the fluorescent emitters. Using quantitative metrics, we showed that the method can recover wide-field images with a photon budget two orders of magnitude lower with no loss of image quality.

Deconvolution and light-field microscopy. Image deconvolution is widely used in optical microscopy, from the restoration of low-quality images to the improvement of super-resolution techniques. However, noise can easily degrade the performance of many common algorithms by producing deconvolution artifacts. Instead, we observed a remarkable reduction of such artifacts in deconvolved images by employing ACsN denoising prior to different methods based on the Richardson-Lucy algorithm, machine learning, and radial fluctuation. The enhancement of image restoration is reflected also by an improvement of the global image quality, evaluated using metrics such as the Resolution Scaled Pearson's coefficient (RSP). For example, combining ACsN and radial fluctuation, we generated super-resolution images with a better RSP value at a temporal resolution up to two orders of magnitude higher than currently reported.

Image deconvolution is also at the basis of three-dimensional reconstruction in light-field microscopy (LFM). LFM employs a microlens array in a microscopy system to obtain both the two-dimensional (2D) spatial and 2D angular information of the incident light, allowing for computational reconstruction of the full 3D volume of a specimen from a single camera frame. However, the deconvolution-based reconstruction process is highly sensitive to the SNR, especially due to LFM's wide-field, volumetric, and fast imaging scheme. For this reason, the use of ACsN to correct the noise in the raw images results in clearly noticeable improvement in the 3D light-field reconstructions. Indeed, the presence of the noise leads to the miscalculation of the 3D object or the propagation of non-fluorophore-associated peaks. The former affects the sampling along the axial dimension and can result in an uneven axial resolution. The latter produces additional background that covers the fluorescence signal, impairing also the lateral resolution. Using ACsN, both deficiencies can be mitigated, resulting in substantially improved 3D volumetric rendering of cellular structures.

Single-molecule localization microscopy. To validate the feasibility of ACsN for single-molecule localization microscopy (SMLM), we performed STORM imaging of mitochondria in HeLa cells. The effect of sCMOS-related noise in single-molecule localization can be seen in two aspects: the presence of false negatives, due to the loss of weakly emitting molecules covered by noise, and the presence of false positives, due to the hot pixels or simply the noise distribution. Removing the noise from the raw single-molecule data allows for suppression of both types of localization errors, resulting in significantly improved STORM image quality and metrics such as the RSP and the Resolution Scaled Error (RSE). Also, such improved efficiency of localization leads to a better contrast and the appearance of features not clearly visible in the reconstruction without denoising. Furthermore, the reduction of pixel fluctuations unrelated to the sample permits to obtain a map of the fluorophores' blinking rate that can be used to alleviate the effects of imperfect labeling.

Like single-molecule imaging, the localization precision in single-particle tracking (SPT) is closely related to the number of photons detected. Therefore, one critical factor affecting the performance of SPT is the SNR of the image data. We showed that ACsN can be used to minimize the localization errors responsible for misidentification of particles and erroneous trajectories. This SNR improvement results in a better particle localization accuracy, i.e., a better estimation of the bead's lateral displacement with sub-pixel sensitivity. This can be of great use also in biplane SPT, where the accuracy of the 3D tracking depends on the quality of the out-of-focus image.

Fluorescence microscopy with low-cost CMOS cameras. Recently, the advances of high-end industrial-grade CMOS cameras have sparked the interest of the scientific community at the possibility to approach the performance of sCMOS cameras at a more affordable price. Such CMOS cameras can be utilized for SMLM imaging. However, the lower quantum efficiency and the higher readout noise limit the image quality and the general usability for quantitative biomedical research in many areas. Addressing the challenge with a proper denoising strategy would provide a timely solution to transform the industrial-grade cameras for broader imaging applications. Here, we first implemented ACsN with a high-end industrial-grade camera for wide-field microscopy using both epi- and TIRF illumination. In both configurations, ACsN denoising substantially improved the image quality, achieving prominent agreement with the images obtained by the sCMOS camera.

The single-photon-excitation-based miniaturized microscope, or miniscope, has been developed to perform wide-field calcium imaging in freely behaving animals. The required miniaturization was achieved by replacing compound objective lenses with a gradient-index (GRIN) rod lens, which offers several advantages, including low cost, light weight, and relatively high-numerical aperture. These features of the miniscope enable minimally invasive imaging of a significant volume of the brain with a cellular-level resolution during complex behavioral, cognitive and emotional states. However, the low-cost CMOS sensor currently adopted yields a poor image quality in order to obtain a relatively high imaging speed, which can be severely restrictive for broader applications in cell imaging. Here, we validated the feasibility of ACsN for the miniscope sensor by performing single-photon-excitation-based, wide-field imaging of GFP-stained calcein in live Adipocytes.

Selective plane illumination microscopy. In contrast to wide-field microscopy, selective plane illumination microscopy (SPIM) illuminates the sample with a sheet of light perpendicular to the direction of observation. This avoids unnecessary illumination, permitting an unparalleled long-term imaging of dynamic biological specimens. Lattice light-sheet microscopy (LLSM) further optimizes the optical system by illuminating the sample with multiple plane waves that sculpt a propagation-invariant optical lattice. However, while new strategies are being investigated to deal with sample-related issues, camera noise remains the most relevant limitation to SPIM and LLSM imaging capabilities due to their relatively low-background signal.

We first demonstrated that ACsN denoising can overcome this limitation by performing a SPIM volumetric scan of a fixed brine shrimp. Here, we enhanced the self-similarity using 3D sparse filtering along the scan direction. After ACsN processing, we observed that noise-canceling makes the sample's details stand out better in each individual slice. In particular, the correction of the fixed-pattern noise is especially noticeable in the maximum intensity projection images. In addition, it is remarkable to observe a clear improvement in the orthogonal cross-sections of the scanned volume, allowing for a better assessment of the sample's 3D structures.

To validate ACsN processing for LLSM, we first imaged fixed skin cells stained for Keratin with EGFP at different exposure times (5, 10, and 20 ms) using a constant laser illumination power of 27 mW (measured at the back focal plane of the illumination objective). These images were acquired using the sample scan mode and, accordingly, the slices had to be deskewed to retrieve the original positions. We performed such operation before ACsN denoising in order to utilize the self-similarity along z for 3D sparse filtering. We observed that the image quality can be well maintained by denoising even after a fourfold reduction of the exposure time.

Furthermore, we demonstrated ACsN image restoration of time-lapse live-cell LLSM imaging. First, we imaged live human lung cancer cells (NCI-H1299 NSCLC) in the sample scan mode with intervals of 18.4 s over more than 30 min. As stated above, the sample scan mode requires deskewing of the volumetric slices, which increases the size of the dataset and, then, the processing complexity. In contrast to the previous case, however, for time-lapse imaging we were able to utilize the temporal self-similarity, which yields a more efficient noise correction compared to the volumetric one. Therefore, we denoised the time-lapse volumetric scans by processing the corresponding temporal stacks of each individual slice. This way, ACsN could be used before deskewing, effectively preserving the denoising performance while saving the computational time. Next, we observed the movement of endogenous F-actin in live mouse embryonic fibroblasts using LLSM in the sheet scan mode. Notably, this mode does not produce any shift between the slices, and the volumetric information can be retrieved without deskewing. In particular, the movement of filopodia all around the cell can be observed with higher clarity after denoising.

Many imaging methods rely on computational analysis to extract additional information from digital images. However, even modest noise levels can introduce errors that propagate through the processing pipeline, deteriorating the quality of the final results. Here, we proposed a denoising method designed for fluorescence microscopy. This is based on a theoretical noise model that effectively considers multiple noise sources and allows for a joint estimation of the noise variance using high-frequency analysis. The algorithm is composed of three components intrinsically linked to each other and critical for the feasibility: camera calibration, noise estimation, and sparse filtering. The camera calibration removes the spatially correlated fixed-pattern noise and allows for a physics-based estimation of the white noise. Such estimation reveals the spatial fluctuation of the noise across the image, essential for the subsequent non-local sparse filtering process. Finally, the use of patch-based sparse filtering enhances intensity uniformity, facilitating the correction of spatially varying noise.

Patch-based algorithms have been extensively adopted in the processing of natural images. However, the performance of the existing methods can be severely affected by a low SNR, hindering a real breakthrough in fluorescence microscopy. On the contrary, our implementation has significantly advanced the approach by employing the inherent characteristics of the imaging system and the fluorescent biological samples. This improves ACsN noise correction by up to two orders of magnitude in terms of the mean square error (MSE) compared to general-purpose sparse filtering. Furthermore, compared to the existing approaches that address the noise correction of sCMOS cameras for wide-field microscopy, ACsN denoising shows a sevenfold improvement in the MSE and up to two orders of magnitude improvement in runtime, mainly because of the new noise model and algorithmic scheme.

We demonstrated the broad applicability of ACsN by showing its performance in diverse experimental conditions, with different sensors, and for a wide range of applications. In addition, we have also demonstrated that the noise correction of sCMOS images can result in a major improvement of the downstream analysis. Finally, by processing time series of both fixed and live samples, we observed a substantial reduction of pixel fluctuations and, thus, of the measurement errors, allowing for accurate, quantitative study of time-lapse data. In this regard, users should be aware that such errors may not be completely removed, but we observed that they are reduced to the error level or lower of an ideal camera. This allows for an acceptable denoising accuracy even at low-light intensity, down to 5-10 photons per pixel. However, the determination of a minimum threshold for denoising reliability under a lower photon flux may vary depending on the validity of the noise model, as well as the camera, specimen or imaging technique used. For this reason, it is advisable to calibrate and test the algorithm before applying it to any new type of data. To help with this task, ACsN also provides an evaluation of the restoration quality that allows users to identify images where denoising may not be accurate.

Methods Camera calibration. To calibrate the pixel-dependent offset of the CMOS cameras used in this work, we disabled the automatic pixel correction to avoid automatic replacement of hot pixels by the average of the neighboring pixels. Then, we recorded a series of dark images and calculated the temporal mean for each pixel. We used 10,000 frames for the ORCA-Flash-4.0 sCMOS (Hamamatsu Photonics) and PCO.Edge, and 5000 frames for the Grasshopper 3 CMOS camera (GS3¬U3-51S5M-C, FUR Imaging) and the Miniscope's CMOS sensor (MT9V032C12STM, Aptina-On Semiconductor). The amplification gain was estimated from multiple sets recorded at different illumination intensities ranging from ~20 to 500 photons per pixel. The gain for each pixel was calculated using the relation:

$$g_i = \operatorname{argmin} \sum_{k=1}^{K} \left( (v_i^k - \operatorname{var}_i) - g_i(D_i^k - o_i) \right)^2$$

where K is the total number of illumination levels acquired, k is the kth illumination sequence, Dk stands for the mean count in analog-to-digital units (ADU) i obtained from temporal averaging of all frames that are acquired during illumination sequence k in pixel i, oi, and vari are the mean and variance values for pixel k i, and vi stands for the temporal variance of the ADU counts for illumination sequence k in pixel i.

Quality metrics. To quantify the quality of image restoration for wide-field images we used three popular metrics: mean square error (MSE), peak signal to noise ratio (PSNR), and structural similarity index (SSIM). The MSE is an element-wise difference between two input images, where the ideal value is zero. The MSE is computed by squaring the difference of corresponding pixels in each image X and Y and taking the mean of the squared differences:

$$MSE(X, Y) = \frac{1}{N}\sum_{p=1}^{N}(X_p - Y_p)^2$$

The PSNR is derived from the MSE, and indicates the ratio of the maximum pixel intensity to the power of the distortion.

$$PSNR(X, Y) = 10 \cdot \log_{10}\left(\frac{\max(Y)^2}{MSE(X, Y)}\right)$$

The SSIM metric is widely adopted in image processing to evaluate image fidelity from an objective point of view. This index is an alternative to error summation methods (like SNR or MSE) and it is supposed to give more information about image distortion by the computation of local image structure, luminance, and contrast into a single local quality score. In this metric, structures are patterns of pixel intensities, especially among neighboring pixels, after normalizing for luminance and contrast:

$$SSIM(X, Y) = \frac{(2\mu_X\mu_Y)(2\sigma_{XY})}{(\mu_X^2 + \mu_Y^2)(\sigma_X^2 + \sigma_Y^2)}$$

where µX, µY, σX, σY, and σXY are the local means, standard deviations, and cross-covariance for images X and Y. As the human visual system is good at perceiving structure, the SSIM quality metric agrees more closely with the subjective quality score.

To assess the quality improvement of image deconvolution and STORM reconstructions, we used NanoJ-SQUIR-REL to evaluate the resolution scaled error (RSE) and the resolution scaled Pearson's coefficient (RSP). The RSE is a metric describing the root mean square error between a reference image and the resolution- and intensity-scaled super-resolution image. It exhibits intensity-dependence and as such, it is sensitive to any non-linear intensity scaling. Lower values indicate better agreement. Instead, the RSP describes the Pearson correlation coefficient between the reference image and the resolution scaled image. This metric is independent of image intensity and normalized between −1 and 1, where 1 represents the ideal agreement.

Wide-field epi-fluorescence, TIRF, and STORM imaging. All the epi-fluorescence, TIRF, and STORM acquisitions were performed on an inverted optical fluorescent microscope (Nikon Ti-U). A 647 nm laser (MPB) and a 405 nm laser (OBIS) were used to excite and switch the reporter fluorophores (Alexa 647). The lasers were coupled into an optical fiber (Thorlabs) and sent to the microscope. An oil-immersion objective (NA 1.45, 100× Nikon CFI-PLAN Apo Lambda, Nikon) was used to enable sub-cellular structure imaging. A lens with focal length of 20 cm was used to focus the laser beam in different incident angles. TIRF illumination was enabled to reduce the background introduced by the structures deep in the sample and enhance the contrast of the acquired frames. The emitted fluorescence was collected with a sCMOS camera (Hamamatsu ORCA 4.0 V3) at the right-side camera port and with an industrial-grade CMOS camera (GS3-U3-51S5M-C, FLIR Imaging) at the left-side camera port.

HeLa cells (ATCC, Manassas, VA) were plated on a 35 mm MatTek glass-bottom plate and incubated at 37° C. with 5% $CO_2$. After 16 h, the cells were fixed for 10 min at 37° C. using 4% formaldehyde (Electron Microscopy Sciences) resolved in phosphate-buffered saline (PBS). The cells were then washed and incubated for an hour in the 1 mL blocking solution 1% (vol/vol) bovine serum albumin (BSA) (Santa Cruz Biotechnologies) and 0.25% (vol/vol) Triton X-100 prepared in PBS. A focus lock was used to stabilize the microscopic stage during the image acquisition. The infrared laser was separated by a beam splitter into two beams: one was reflected by the glass-oil interface between the objective lens and the microscope slide and then induced into a Thorlabs CMOS camera; the other was directed into the camera. The distance between two beam spots on the camera was therefore sensitive to the position of the stage (i.e., the distance between the objective lens and the microscope slide), and this information was fed back to a piezo actuator (Mad City Labs) by the STORM software to correct the axial drift of the stage.

Figure 5:
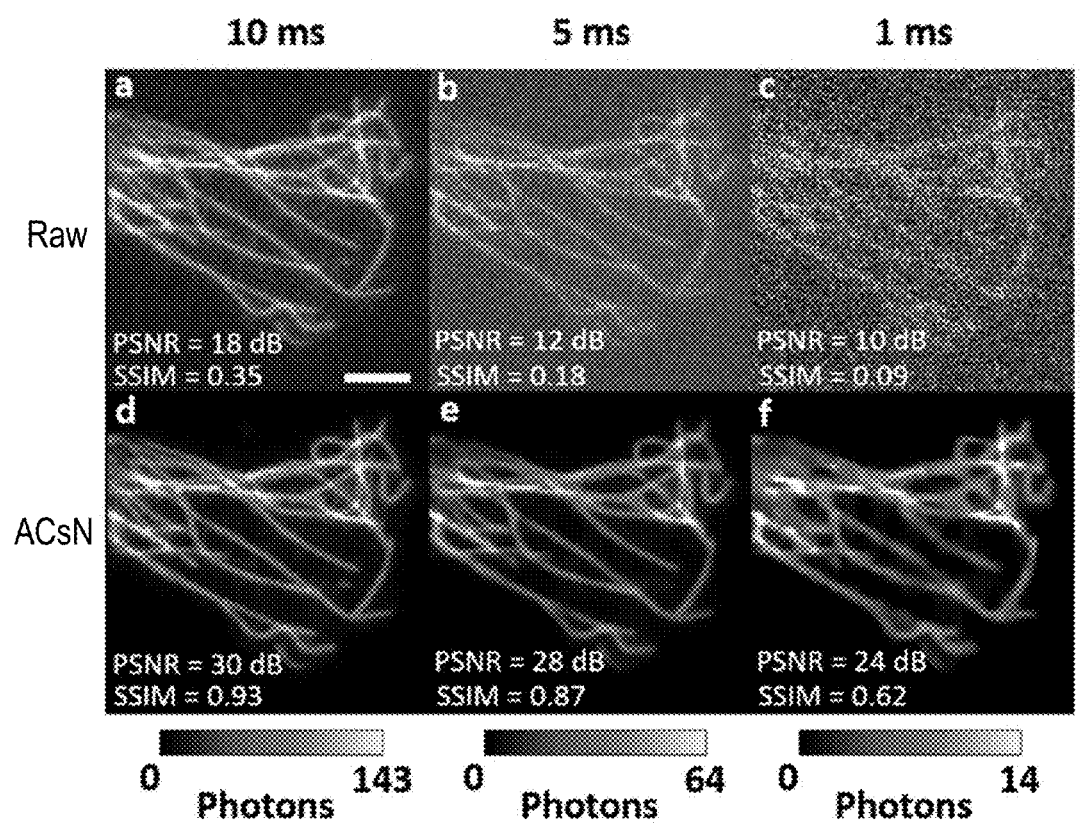
FIG. 5 is a series of ACsN image restoration stages of biological samples at varying light levels.

Raw images and ACsN restored images of biological samples photographed at varying light levels are show in FIG. 5. These figures include three sequences of 100 images of microtubules of HeLa cells that were recorded using TIRF microscopy with the same illumination intensity but at different exposure times: 10 ms (a), 5 ms (b), and 1 ms. Each series was processed with ACsN. A representative frame for each sequence is shown. This figure demonstrates that a noticeable improvement in image quality can be recovered at low light levels (e.g. <15 photons/pixel in image (c)), despite the loss of some fine details. The values are the average values obtained from each sequence of 100 images. Quantitative measurement shows substantial improvement in image quality using ACsN, as well as the influence of the photon flux in the restoration, consistent with the observations.

While the embodiments shown above relate to biological imaging using a scientific CMOS camera, it can also apply to other types of imaging, including astronomic (telescopic) imaging and other types imaging, including other types of low-light imaging.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of filtering an image from data received from a CMOS camera, comprising the steps of:
    (a) loading image data corresponding to an initial image from the CMOS camera, wherein the initial image is of a known type in a two-dimensional domain;
    (b) loading camera parameters corresponding to the CMOS camera;
    (c) removing fixed pattern noise associated with the CMOS camera from the image data based on the camera parameters;
    (d) generating a readout noise estimation based on characteristics of the CMOS camera and filtering estimated readout noise from the image data; and
    (e) performing sparse filtering on the image data by performing steps including:
        (i) selecting at least a first plurality of sub-frames within the initial image that have similar features;
        (ii) applying a three-dimensional transform on sub-frame data corresponding to the first plurality of sub-frames so as transform the sub-frame data into a non-two-dimensional domain, thereby generating a first transformed data set;
        (iii) filtering noise data from the first transformed data set using predetermined thresholds so as to generate a first thresholded image data set; and
        (iv) applying a reverse three-dimensional transform on the first thresholded image data set so as to generate a thresholded image.

2. The method of claim 1, further comprising the steps of:
    (a) selecting at least a second plurality of sub-frames within the thresholded image that have similar features;
    (b) applying the three-dimensional transform on sub-frame data corresponding to the second plurality of sub-frames so as transform the sub-frame data into the non-two-dimensional domain, thereby generating a second transformed image data set;
    (c) applying Wiener filtering to the second transformed image data set so as to generate Wiener filtered data; and
    (d) applying the reverse three-dimensional transform on the Wiener filtered data so to generate a Wiener filtered image.

3. The method of claim 2, further comprising the steps of:
    (a) selecting at least a third plurality of sub-frames, each of which is from a different sequential frame of a plurality of frames taken over time wherein each of the third plurality of sub-frames have similar features;
    (b) applying a three-dimensional transform on sub-frame data corresponding to the third plurality of sub-frames so as transform the sub-frame data into a non-two-dimensional domain, thereby generating a third transformed data set;
    (c) filtering noise data from the third transformed data set using predetermined thresholds so as to generate a third thresholded image data set; and
    (d) applying a reverse three-dimensional transform on the third thresholded image data set so to generate a third thresholded image.

4. The method of claim 1, wherein the CMOS camera comprises a scientific CMOS camera.

5. The method of claim 1, wherein the known type initial image is a fluorescent image type.

6. The method of claim 1, wherein the known type initial image is an astronomical image type.

7. The method of claim 1, wherein the step of removing fixed pattern noise comprises the step of adjusting pixel values based on a gain map corresponding to the CMOS camera.

8. The method of claim 1, wherein the step of generating a readout noise estimation comprises the steps of
    (a) calculating an optical transfer function corresponding to the CMOS camera;
    (b) generating a high-pass filter based on the optical transfer function; and
    (c) filtering the image data with the high-pass filter.

9. A method of filtering an image from data received from a scientific CMOS camera, comprising the steps of:
    (a) loading image data corresponding to an initial image from the scientific CMOS camera, wherein the initial image is of a known type in a two-dimensional domain;
    (b) loading camera parameters corresponding to the scientific CMOS camera;
    (c) removing fixed pattern noise associated with the scientific CMOS camera from the image data based on the camera parameters;
    (d) generating a readout noise estimation based on characteristics of the scientific CMOS camera and filtering estimated readout noise from the image data by performing the steps of:
        (i) calculating an optical transfer function corresponding to the scientific CMOS camera;
        (ii) generating a high-pass filter based on the optical transfer function; and
        (iii) filtering the image data with the high-pass filter;
    (e) performing sparse filtering on the image data by performing steps including:
        (i) selecting at least a first plurality of sub-frames within the initial image that have similar features;
        (ii) applying a three-dimensional transform on sub-frame data corresponding to the first plurality of sub-frames so as transform the sub-frame data into a non-two-dimensional domain, thereby generating a first transformed data set;
        (iii) filtering noise data from the first transformed data set using predetermined thresholds so as to generate a first thresholded image data set; and
        (iv) applying a reverse three-dimensional transform on the first thresholded image data set so as to generate a thresholded image;
    (f) selecting at least a second plurality of sub-frames within the thresholded image that have similar features;
    (g) applying the three-dimensional transform on sub-frame data corresponding to the second plurality of sub-frames so as transform the sub-frame data into the non-two-dimensional domain, thereby generating a second transformed image data set;

(h) applying Wiener filtering to the second transformed image data set so as to generate Wiener filtered data; and
(i) applying the reverse three-dimensional transform on the Wiener filtered data so to generate a Wiener filtered image.

10. The method of claim 9, wherein the known type initial image is a fluorescent image type.

11. The method of claim 9, wherein the step of removing fixed pattern noise comprises the step of adjusting pixel values based on a gain map corresponding to the CMOS camera.

12. The method of claim 9, further comprising the steps of:
(a) selecting at least a third plurality of sub-frames, each of which is from a different sequential frame of a plurality of frames taken over time wherein each of the third plurality of sub-frames have similar features;
(b) applying a three-dimensional transform on sub-frame data corresponding to the third plurality of sub-frames so as transform the sub-frame data into a non-two-dimensional domain, thereby generating a third transformed data set;
(c) filtering noise data from the third transformed data set using predetermined thresholds so as to generate a third thresholded image data set; and
(d) applying a reverse three-dimensional transform on the third thresholded image data set so to generate a third thresholded image.

13. A CMOS camera, comprising:
(a) a CMOS video sensor; and
(b) a processor that is receptive to image data from the CMOS video sensor, the processor programmed to execute a plurality of instructions, including:
(i) loading image data corresponding to an initial image from the CMOS camera, wherein the initial image is of a known type in a two-dimensional domain;
(ii) loading camera parameters corresponding to the CMOS camera;
(iii) removing fixed pattern noise associated with the CMOS camera from the image data based on the camera parameters;
(iv) generating a readout noise estimation based on characteristics of the CMOS camera and filtering estimated readout noise from the image data; and
(v) performing sparse filtering on the image data by performing steps including:
(1) selecting at least a first plurality of sub-frames within the initial image that have similar features;
(2) applying a three-dimensional transform on sub-frame data corresponding to the first plurality of sub-frames so as transform the sub-frame data into a non-two-dimensional domain, thereby generating a first transformed data set;
(3) filtering noise data from the first transformed data set using predetermined thresholds so as to generate a first thresholded image data set; and
(4) applying a reverse three-dimensional transform on the first thresholded image data set so as to generate a thresholded image.

14. The CMOS camera of claim 13, wherein the processor is further programmed to execute instructions including:
(a) selecting at least a second plurality of sub-frames within the thresholded image that have similar features;
(b) applying the three-dimensional transform on sub-frame data corresponding to the second plurality of sub-frames so as transform the sub-frame data into the non-two-dimensional domain, thereby generating a second transformed image data set;
(c) applying Wiener filtering to the second transformed image data set so as to generate Wiener filtered data; and
(d) applying the reverse three-dimensional transform on the Wiener filtered data so to generate a Wiener filtered image.

15. The CMOS camera of claim 14, wherein the processor is further programmed to execute instructions including:
(a) selecting at least a third plurality of sub-frames, each of which is from a different sequential frame of a plurality of frames taken over time wherein each of the third plurality of sub-frames have similar features;
(b) applying a three-dimensional transform on sub-frame data corresponding to the third plurality of sub-frames so as transform the sub-frame data into a non-two-dimensional domain, thereby generating a third transformed data set;
(c) filtering noise data from the third transformed data set using predetermined thresholds so as to generate a third thresholded image data set; and
(d) applying a reverse three-dimensional transform on the third thresholded image data set so to generate a third thresholded image.

16. The CMOS camera of claim 13, wherein the CMOS camera comprises a scientific CMOS camera.

17. The CMOS camera of claim 13, wherein the known type initial image is a fluorescent image type.

18. The CMOS camera of claim 13, wherein the known type initial image is an astronomical image type.

19. The CMOS camera of claim 13, wherein the instruction of removing fixed pattern noise comprises an instruction of adjusting pixel values based on a gain map corresponding to the CMOS camera.

* * * * *